(12) United States Patent
Takaki

(10) Patent No.: US 9,228,548 B2
(45) Date of Patent: Jan. 5, 2016

(54) INTAKE DEVICE FOR INTERNAL COMBUSTION ENGINE WITH SUPERCHARGER

(75) Inventor: Daisuke Takaki, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 183 days.

(21) Appl. No.: 14/128,133

(22) PCT Filed: Feb. 15, 2012

(86) PCT No.: PCT/JP2012/053478
§ 371 (c)(1),
(2), (4) Date: Dec. 20, 2013

(87) PCT Pub. No.: WO2012/176490
PCT Pub. Date: Dec. 27, 2012

(65) Prior Publication Data
US 2014/0130783 A1    May 15, 2014

(30) Foreign Application Priority Data
Jun. 22, 2011    (JP) ................................ 2011-138414

(51) Int. Cl.
*B60T 7/12*    (2006.01)
*F02M 35/10*    (2006.01)
(Continued)

(52) U.S. Cl.
CPC ............... *F02M 35/10* (2013.01); *F02B 37/00* (2013.01); *F02B 37/16* (2013.01); *F02B 37/18* (2013.01); *F02D 41/1446* (2013.01);
(Continued)

(58) Field of Classification Search
CPC ................................................... F02D 41/0072
USPC ........... 701/108; 123/568.11, 568.21; 60/272, 60/285
See application file for complete search history.

(56) References Cited

U.S. PATENT DOCUMENTS 5,797,380 A    8/1998 Tada et al.
2008/0167786 A1*    7/2008 Sasaki et al. .......... F02D 35/023
701/102
(Continued)

FOREIGN PATENT DOCUMENTS

JP    2-125920 A    5/1990
JP    10-274026 A    10/1998
(Continued)

*Primary Examiner* — John Kwon
(74) *Attorney, Agent, or Firm* — Foley & Lardner LLP

(57) ABSTRACT

A compressor (5) of a turbo supercharger (3) is located between an air flow meter (12) and a throttle valve (13). An EGR passage (21) is connected to an intake passage (10) at a joint (22) upstream of the compressor (5). The following relationship (1) is satisfied between an intake passage volume ($V_1$) from the air flow meter (12) to the junction (22), an intake passage volume ($V_2$) from the compressor (5) to the throttle valve (13) and a maximum boost pressure ($P_b$) under operating conditions in which the introduction of EGR gas is performed, in order to prevent a mixed gas of fresh air and EGR gas from flowing back to the air flow meter (12) even under the maximum boost pressure ($P_b$).

$$V_1 > V_2 \times \left(\frac{P_b - P_1}{P_1}\right) \times \left(\frac{P_1}{P_b}\right)^{\frac{\kappa-1}{\kappa}} \quad (1)$$

4 Claims, 2 Drawing Sheets

(51) Int. Cl.
  *F02B 37/00* (2006.01)
  *F02B 37/16* (2006.01)
  *F02B 37/18* (2006.01)
  *F02M 25/07* (2006.01)
  *F02D 41/14* (2006.01)
  *F02D 41/18* (2006.01)
  *F02B 29/04* (2006.01)
  *F02D 41/00* (2006.01)

(52) U.S. Cl.
  CPC .......... *F02D 41/18* (2013.01); *F02M 25/0709* (2013.01); *F02M 35/10157* (2013.01); *F02B 29/0425* (2013.01); *F02B 29/0437* (2013.01); *F02D 41/0065* (2013.01); *F02D 2200/0402* (2013.01); *F02D 2200/0406* (2013.01); *F02M 25/0731* (2013.01); *Y02T 10/144* (2013.01)

(56) References Cited

U.S. PATENT DOCUMENTS

| | | | |
|---|---|---|---|
| 2010/0179745 A1* | 7/2010 | Nakayama et al. | F02D 41/0072 701/108 |
| 2011/0036332 A1* | 2/2011 | Iwatani | F02B 37/001 123/564 |
| 2014/0102427 A1* | 4/2014 | Korenaga | F02B 37/025 123/568.12 |

FOREIGN PATENT DOCUMENTS

| | | |
|---|---|---|
| JP | 2007-278110 A | 10/2007 |
| JP | 2008-106615 A | 5/2008 |
| JP | 2010-265854 A | 11/2010 |
| JP | 2011-69263 A | 4/2011 |
| JP | 2011-112012 A | 6/2011 |

* cited by examiner

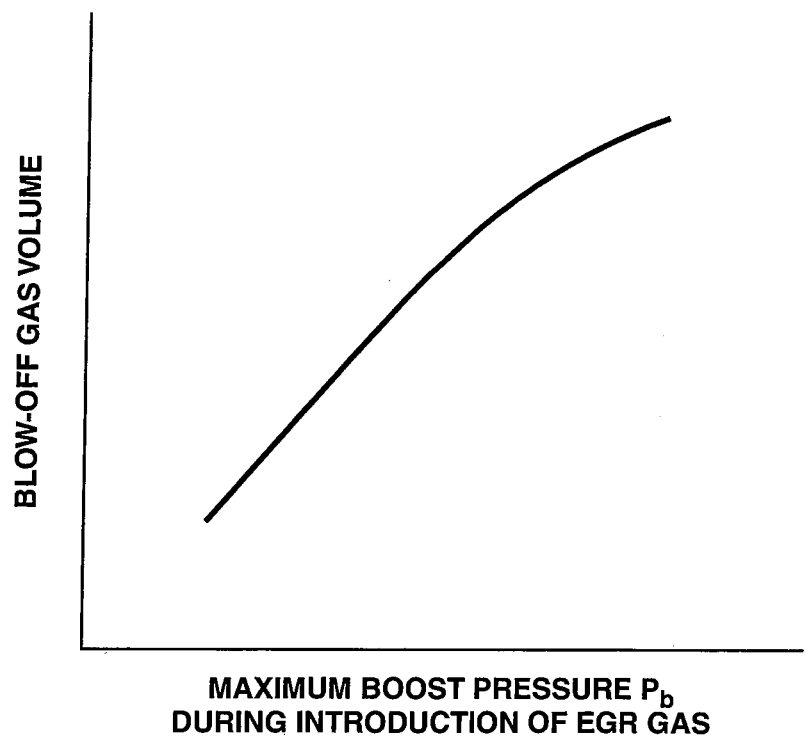

INTAKE DEVICE FOR INTERNAL COMBUSTION ENGINE WITH SUPERCHARGER

FIELD OF THE INVENTION

The present invention relates to an intake device having a recirculation valve for use in a supercharger-equipped internal combustion engine, particularly of the type in which EGR gas is introduced from the upstream of a supercharger compressor.

BACKGROUND ART

As disclosed in Patent Document 1, there is known an intake device for an internal combustion engine with a supercharger such as a turbo supercharger in which the intake device has a recirculation valve for releasing a boost pressure from the downstream to the upstream of a compressor of the supercharger when a throttle valve is closed suddenly in a supercharged state. There is also known an exhaust gas recirculation (EGR) device for introduction of EGR gas from the exhaust system into fresh air at the upstream of the compressor as disclosed in Patent Document 1.

The following problem however arises in the case where the supercharger-equipped internal combustion engine uses the recirculation valve through which the boost pressure is released from the downstream to the upstream of the compressor in combination with the exhaust gas recirculation device by which the EGR gas is introduced into the fresh air at the upstream of the compressor. When the recirculation valve is opened under operating conditions in which exhaust gas recirculation is effected, the mixed gas of fresh air and EGR gas flows back to the upstream side of the intake passage through the recirculation valve so that an intake air flow meter gets fouled by EGR gas components.

PRIOR ART DOCUMENTS

Patent Document

Patent Document 1: Japanese Laid-Open Patent Publication No. 2007-278110

SUMMARY OF THE INVENTION

In view of the foregoing, the present invention provides an intake device for an internal combustion engine with a supercharger, in which the intake device comprises an air flow meter, a throttle valve and a recirculation valve; a compressor of the supercharger is located between the air flow meter and the throttle valve; the recirculation valve is adapted to release a pressure in the downstream of the compressor to the upstream of the compressor during closing of the throttle valve; and an EGR passage is connected at a junction to the upstream of the compressor so as to introduce EGR gas into an intake system through the EGR passage.

In the present invention, the intake device is characteristically configured to satisfy a predetermined relationship between the an intake passage volume ($V_1$) from the air flow meter to the junction of the EGR passage, an intake passage volume ($V_2$) from the compressor to the throttle valve and a maximum boost pressure ($P_b$) under operating conditions in which introduction of EGR gas is performed, in order to prevent a mixed gas of fresh air and EGR gas from flowing back from the downstream of the compressor and reaching the air flow meter when the recirculation valve is opened.

More specifically, the relationship of the following formula (1) is satisfied between the intake passage volume ($V_1$) from the air flow meter to the junction of the EGR passage, the intake passage volume ($V_2$) from the compressor to the throttle valve and the maximum boost pressure ($P_b$) under the operating conditions in which the introduction of EGR gas is performed.

$$V_1 > V_2 \times \left(\frac{P_b - P_1}{P_1}\right) \times \left(\frac{P_1}{P_b}\right)^{\frac{\kappa-1}{\kappa}} \qquad (1)$$

In the above formula, $P_1$ is a pressure in the upstream of the compressor; and $\kappa$ is a specific heat ratio of the mixed gas of fresh air and EGR gas at the downstream of the compressor.

In place of the formula (1), the relationship of the following formula (2) may be satisfied between the intake passage volume ($V_1$) from the air flow meter to the junction of the EGR passage, the intake passage volume ($V_2$) from the compressor to the throttle valve and the maximum boost pressure ($P_b$) under the operating conditions in which the introduction of EGR gas is performed.

$$V_1 > V_2 \times \left(\frac{P_b - P_1}{P_1}\right) \times \frac{T_3}{T_2} \qquad (2)$$

In the above formula, $P_1$ is a pressure in the upstream of the compressor; $T_2$ is a temperature of the gas at the downstream of the compressor under the maximum boost pressure ($P_b$); and $T_3$ is a temperature of the gas released to the upstream of the compressor through the recirculation valve.

Herein, there occurs gas backflow due to expansion of the highly pressurized supercharge gas (mixed gas of fresh air and EGR gas) in the intake passage volume $V_2$ from the compressor to the throttle valve when the recirculation valve is opened. As the pressure in the upstream of the compressor is approximately equal to atmospheric pressure, the gas backflow amount generally increases with the boost pressure. If the gas backflow amount exceeds the intake passage volume $V_1$ from the air flow meter to the junction of the EGR passage (in which only fresh air with no EGR gas exists before opening of the recirculation valve), the mixed gas of fresh air and EGR gas reaches the air flow meter. The mixed gas containing the EGR gas can be thus assuredly prevented from reaching the air flow meter and causing fouling of the air flow meter by setting the intake passage volume $V_1$ from the air flow meter to the junction of the EGR passage relative to the intake passage volume $V_2$ from the compressor to the throttle valve (or the intake passage volume $V_2$ from the compressor to the throttle valve relative to the intake passage volume $V_1$ from the air flow meter to the junction of the EGR passage) as appropriate in accordance with the maximum boost pressure Pb under the operating conditions in which the introduction of EGR gas is performed.

In the present invention, the intake passage volumes are set appropriately in accordance with the maximum boost pressure under the operating conditions in which the introduction of EGR gas is performed as mentioned above. It is therefore possible to assuredly protect the air flow meter from fouling by the EGR gas even when the recirculation valve is opened during exhaust gas recirculation.

BRIEF DESCRIPTION OF DRAWINGS

FIG. 2 is a characteristic diagram showing the relationship between a maximum boost pressure and a blow-off gas volume of the internal combustion engine.

DESCRIPTION OF EMBODIMENTS

Figure 1:
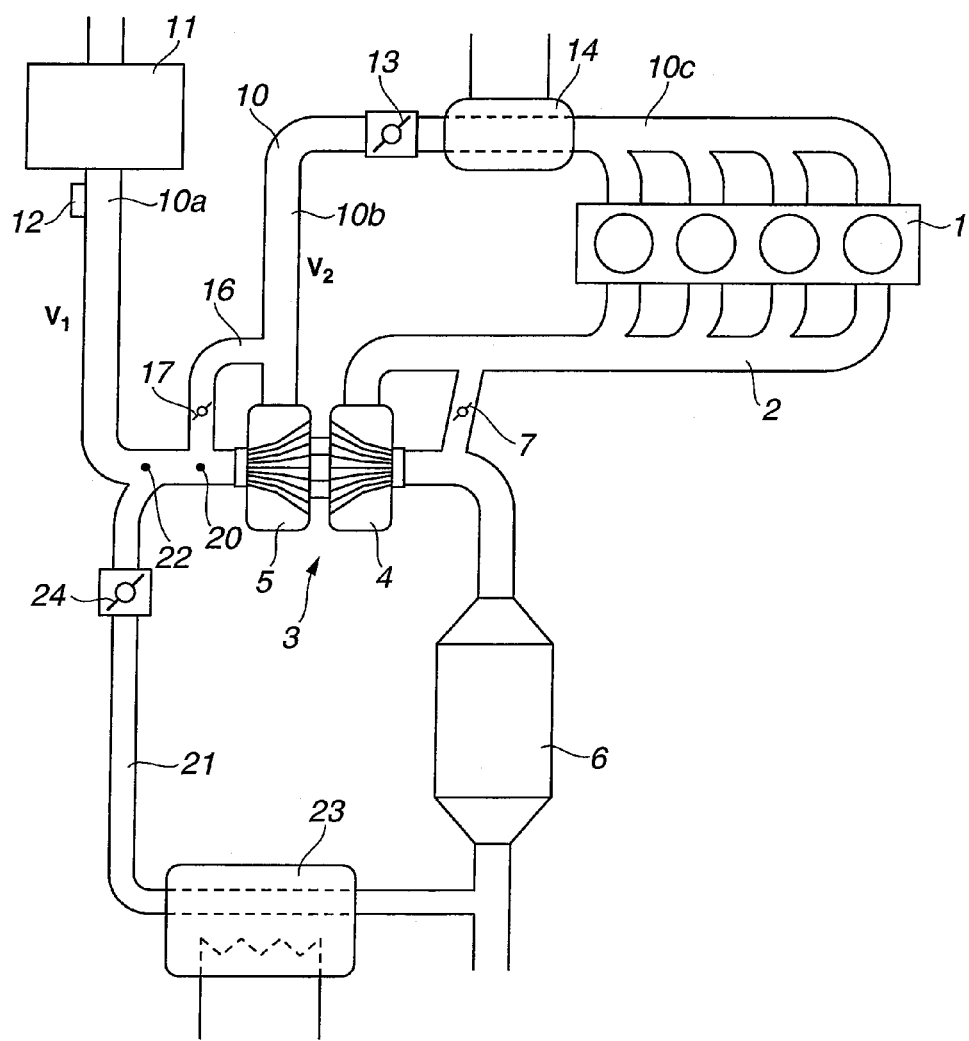
FIG. 1 is a schematic configuration diagram of an intake device for an internal combustion engine according to one embodiment of the present invention, shown together with an exhaust system of the internal combustion engine.

One exemplary embodiment of the present invention will be described below with reference to the drawings.

FIG. 1 is a schematic view showing an overall intake and exhaust system of internal combustion engine 1 on which an intake device according to one embodiment of the present invention is mounted. In the present embodiment, internal combustion engine 1 is a gasoline engine. In exhaust passage 2 of internal combustion engine 1, exhaust turbine 4 of turbo supercharger 3 is arranged. Catalyst converter 6 with e.g. a three-way catalyst is arranged on the downstream of exhaust turbine 4 in exhaust passage 2. Although not shown in the drawing, an exhaust muffler is arranged on the downstream of catalyst converter 6 in exhaust passage 2 so that exhaust passage 2 is open to the outside through the exhaust muffler. Exhaust turbine 4 has a known type of wastegate valve 7 for boost pressure control. Internal combustion engine 1 has e.g. a direct injection configuration in which each cylinder is equipped with a fuel injection valve to inject fuel into the cylinder although not so shown in the drawing.

In intake passage 10 of internal combustion engine 1, air cleaner 11, air flow meter 12 and throttle valve 13 are arranged in the order of mention from the upstream side. Compressor 5 of turbo supercharger 3 is disposed between air flow meter 12 and throttle valve 13 in intake passage 10. In this arrangement, intake passage 10 is generally divided into three portions: compressor-upstream-side passage portion 10a upstream of compressor 5, compressor-downstream-side passage portion 10b between compressor 5 and throttle valve 13 and throttle-downstream-side passage portion 10c between throttle valve 13 and the respective cylinders. In the present embodiment, water-cooling type or oil-cooling type intercooler 14 is disposed in throttle-downstream-side passage portion 10c so that a part of throttle-downstream-side passage portion 10c downstream of intercooler 14 is branched into intake manifolds for the respective cylinders. Alternatively, intercooler 14 may be of air-cooling type.

Recirculation line 16 is provided in intake passage 14 so as to allow communication between the upstream and downstream sides of compressor 5. Recirculation valve 7 is disposed in recirculation line 16. Recirculation valve 17 has a mechanical actuator operable in response to a pressure difference between the upstream and downstream sides of throttle valve 5, or an electrical actuator operable in response to a control signal from a control unit not shown in the drawing, so as to open recirculation line 16 according to a pressure increase in compressor-downstream-side passage portion 10b and thereby release the pressure inside compressor-downstream-side passage portion 10b into compressor-upstream-side passage portion 10a for recirculation of intake air. Recirculation line 16 extends and connects between a point on compressor-downstream-side passage portion 10b close to compressor 5 and a point on compressor-upstream-side passage portion 10a close to compressor 5.

EGR passage 21, which constitutes a part of an exhaust recirculation device, is branched from a point downstream of catalytic converter 6 on exhaust passage 2. One end of EGR passage 21 is connected at junction 22 to compressor-upstream-side passage portion 10a. Junction 22 is located at a relatively downstream side of compressor-upstream-side passage portion 10a, i.e., at a position close to compressor 5 but is located at a position upstream of junction 20 of recirculation line 16 and compressor-upstream-side passage portion 10a. Water-cooling type or oil-cooling type EGR gas cooler 23 is disposed in EGR passage 21 for cooling of EGR gas. Further, exhaust recirculation control valve 24 is disposed at a position downstream of EGR gas cooler 23 to control the exhaust gas recirculation amount according to a target exhaust recirculation rate.

In the above-mentioned configuration, the EGR gas is introduced to the upstream of compressor 5 through exhaust recirculation control valve 24 under predetermined operating conditions in which exhaust recirculation should be effected including supercharged and non-supercharged ranges. In a supercharged range, the mixed gas of fresh air and EGR gas is pressurized by compressor 5, passes through throttle valve 13 and intercooler 14 and is fed to the respective cylinders of internal combustion engine 1. When throttle valve 13 is closed suddenly by e.g. driver's accelerator pedal operation in the supercharged range, recirculation valve 17 is opened in response to the closing of throttle valve 13 so that the highly pressurized fresh air/gas mixture in compressor-downstream-side passage portion 10b is released to compressor-upstream-side passage portion 10a. The released fresh air/gas mixture is circulated through recirculation line 16 even if compressor 5 keeps on rotating under the action of rotor inertia. This makes it possible to avoid abnormal noise caused by surge of compressor 5.

When recirculation valve 17 is opened in response to the closing of throttle valve 13 under the operating conditions in which exhaust gas recirculation is conducted, the relatively highly pressurized mixed gas of fresh air and EGR gas in compressor-downstream-side passage portion 10b expands through recirculation valve 17. As a result, there occurs backflow of the mixed gas of fresh air and EGR gas into compressor-upstream-side passage portion 10a. If the mixed gas of fresh air and EGR gas flows back and reaches air flow meter 12, air flow meter 12 would unfavorably be fouled by EGR gas components.

In order to prevent the mixed gas of fresh air and EGR gas from reaching air flow meter 12, the relationship of the following formula (1) is satisfied between the volume $V_1$ of compressor-upstream-side passage portion 10a and, more specifically, part of compressor-upstream-side passage portion 10a from air flow meter 12 to junction 22 of EGR passage 22 and compressor-upstream-side passage portion 10a in which only the fresh air with no EGR gas exists, the volume $V_2$ of compressor-downstream-side passage portion 10b (part from compressor 5 to throttle valve 13) in which the pressurized mixed gas of fresh air and EGR gas exists and the maximum boost pressure $P_b$ (kPa) under the operating conditions in which the introduction of the EGR gas is conducted in the present invention.

$$V_1 > V_2 \times \left(\frac{P_b - P_1}{P_1}\right) \times \left(\frac{P_1}{P_b}\right)^{\frac{\kappa-1}{\kappa}} \qquad (1)$$

In the formula (1), $P_1$ is a pressure (kPa) in compressor-upstream-side passage portion 10a that is upstream of compressor 5; and $\kappa$ is a specific heat ratio of the mixed gas of fresh air and EGR gas in compressor-downstream-side passage portion 10b that is downstream of compressor 5. The pressure $P_1$ in the upstream of compressor 5 can be substantially regarded as atmospheric pressure.

The above relationship may alternatively be expressed by the following formula (2) using the temperature $T_2$ (° K) of the gas in compressor-downstream-side passage portion 10b under the maximum boost pressure $P_b$ and the temperature $T_3$ (° K) of the gas released to the upstream of compressor 5 through recirculation valve 17.

$$V_1 > V_2 \times \left(\frac{P_b - P_1}{P_1}\right) \times \frac{T_3}{T_2} \quad (2)$$

The gas temperature $T_2$ is given by the following formula (3) based on a compressor efficiency $\eta_{comp}$ (%) of compressor 5.

$$T_2 = T_1 + \frac{T_2' - T_1}{\eta_{comp}/100} \quad (3)$$

In the formula (3), $T_2'$ is a temperature (° K) of the gas after theoretical isentropic compression from the pressure $P_1$ in the upstream of compressor 5 to the maximum boost pressure $P_b$.

Further, the gas temperature $T_3$ is given by the following formula (4).

$$T_3 = T_2 \times \left(\frac{1}{\pi_c}\right)^{\frac{\kappa-1}{\kappa}} \quad (4)$$

In general, the first term of the right side of the above formula (1) corresponds to the volume of excessive gas that would flow out to compressor-upstream-side passage portion 10a through recirculation valve 17 at the time the gas under the boost pressure $P_b$ expands to the pressure $P_1$ in the upstream of compressor 5; and the second term of the right side of the above formula (1) corresponds to the term for correction according to the change in temperature of the gas. At the occasion of gas backflow, the gas existing in compressor-upstream-side passage portion 10a (more specifically, in the part of compressor-upstream-side passage portion 10a from air flow meter 12 to junction 22 of EGR passage 22 and compressor-upstream-side passage portion 10a) first flows through air flow meter 12 in a reverse direction. The gas existing in this part is, however, the fresh air with no EGR and does not become a cause of fouling of air flow meter. Consequently, consideration should be given to expansion of the gas (volume: $V_2$, pressure: $P_b$) existing in compressor-downstream-side passage portion 10b at the time of opening of recirculation valve 17.

The following formula holds based on the general relationship of "$P \times V^{\kappa}$=constant" for adiabatic gas change where P (kPa) is a gas pressure; V (m³) is a gas volume; and $\kappa$ is a specific heat ratio. In the following formula, the subscript $\alpha$ indicates a state before the change; and the subscript $\beta$ indicates a state after the change.

$$P_\alpha \times V_\alpha^\kappa = P_\beta \times V_\beta^\kappa$$

The following formula (5) is derived from the above formula.

$$\frac{V_\alpha}{V_\beta} = \left(\frac{P_\beta}{P_\alpha}\right)^{\frac{1}{\kappa}} \quad (5)$$

The following formulas also hold based on the general relationship of "$T \times V^{\kappa-1}$=constant".

$$T_\alpha \times V_\alpha^{\kappa-1} = T_\beta \times V_\beta^{\kappa-1}$$

$$T_\beta = T_\alpha \times (V_\alpha/V_\beta)^{\kappa-1}$$

The following formula (6) is then derived by substitution of the above formulas into the formula (5).

$$T_\beta = T_\alpha \times \left(\frac{P_\beta}{P_\alpha}\right)^{\frac{\kappa-1}{\kappa}} \quad (6)$$

On the other hand, the volume of excessive gas at the time the gas of volume $V_2$ under the boost pressure $P_b$ in compressor-downstream-side passage portion 10b expands to the pressure $P_1$ is expressed by the first term of the right side of the above formula (1) as mentioned above. This volume is a value at the temperature $T_2$ under the supercharged state. The gas volume at the temperature $T_3$ after the opening of recirculation valve 17 is ($T_3/T_2$) times the above value.

The volume $V_{flow}$ of excessive gas (blow-off gas) released through recirculation gas 17 is thus given by the following formula as in the right side of the above formula (2).

$$V_{flow} = V_2 \times \{(P_b - P_1)/P_1\} \times (T_3/T_2)$$

Herein, the gas temperature $T_3$ is expressed by the following formula (7) as derived from the above formula (6).

$$T_3 = T_2 \times \left(\frac{P_1}{P_b}\right)^{\frac{\kappa-1}{\kappa}} \quad (7)$$

The formula (7) is substituted into the above formula.

$$V_{flow} = V_2 \times \left(\frac{P_b - P_1}{P_1}\right) \times \left(\frac{P_1}{P_b}\right)^{\frac{\kappa-1}{\kappa}} \quad (8)$$

Thus, the blow-off gas volume is given by the formula (8).

In order to prevent the backflow gas from reaching air flow meter 12, the intake passage volume $V_1$ from the passage junction up to air flow meter 12 needs to be larger than the blow-off gas volume $V_{flow}$. It is thus necessary to satisfy the relationship of the above formula (1).

In other words, it is possible by setting the intake passage volume $V_1$ to be larger than the blow-off gas volume $V_{flow}$ at the maximum boost pressure $P_b$ under the operating conditions in which the introduction of EGR gas is performed to protect air flow meter 12 from fouling by the EGR gas in view of the fact that the blow-off gas volume $V_{flow}$ varies depending on the boost pressure $P_b$ as shown in FIG. 2.

As mentioned above, the gas temperature $T_2$ is given by the formula (3) based on the compressor efficiency $\eta_{comp}$ (%) of compressor 5.

The following formula (9) is derived from the formula (6) where $T_1$ is a temperature of the gas at the upstream of compressor 5; and $T_2'$ is a temperature of the gas after theoretical isentropic compression from the pressure $P_1$ to the maximum boost pressure $P_b$ by compressor 5.

$$T_2' = T_1 \times \left(\frac{P_b}{P_1}\right)^{\frac{\kappa-1}{\kappa}} \quad (9)$$

It is herein defined that: $\pi_c$ is a pressure ratio ($\pi_c = P_b/P_1$); $\Delta T$ is a difference between the temperature $T_1$ and the temperature $T_2'$ after theoretical isentropic compression ($\Delta T = T_2' - T_1$); and $\eta_{comp}$ (%) is a compressor efficiency. The increase in temperature of the gas is expressed by $\Delta T/(\eta_{comp}/100)$.

$$T_2 = T_1 + \frac{T_2' - T_1}{\eta_{comp}/100} \quad (3)$$

The gas temperature $T_2$ after compression is thus given by the formula (3).

Further, the gas temperature $T_3$ is given by the following formula (4) as derived from the above formula (6) using the pressure ratio $\pi_c$.

$$T_3 = T_2 \times \left(\frac{1}{\pi_c}\right)^{\frac{\kappa-1}{\kappa}} \quad (4)$$

The factor of the right side of the above formula (1) is approximately 0.67 based on the assumption that the maximum boost pressure $P_b$ is 180 kPa, the pressure $P_1$ in the upstream of compressor 5 is 100 kPa and the specific heat ratio $\kappa$ is 1.4.

The fouling of air flow meter 12 by gas backflow can be thus substantially avoided by simply setting the intake passage volumes $V_1$ and $V_2$ in such a manner as to satisfy the following relationship.

$$V_1 > 0.65 \times V_2$$

It is herein noted that, although the above embodiment specifically refers to the case where turbo supercharger 3 having compressor 5 and exhaust turbine 4 coaxially connected to each other is adopted as the supercharger, the supercharger is not limited to such a turbo supercharger in the present embodiment. Any type of supercharger can be applied as long as the intake device is equipped with the recirculation valve.

The invention claimed is:

1. An intake device for an internal combustion engine with a supercharger, the intake device comprising an intake passage equipped with an air flow meter, a throttle valve and a recirculation valve, a compressor of the supercharger being located between the throttle valve and the air flow meter, the recirculation valve being adapted to release a pressure in the downstream of the compressor to the upstream of the compressor during closing of the throttle valve, an EGR passage of the internal combustion engine being connected to the intake passage at a junction upstream of the compressor so as to introduce EGR gas into an intake system through the EGR passage, wherein either one of the following formulas (1) and (2) is satisfied between an intake passage capacity ($V_1$) from the air flow meter to the junction of the intake passage and the EGR passage, an intake passage capacity ($V_2$) from the compressor to the throttle valve and a maximum boost pressure ($P_b$) under operating conditions in which the introduction of the EGR gas is performed:

$$V_1 > V_2 \times \left(\frac{P_b - P_1}{P_1}\right) \times \left(\frac{P_1}{P_b}\right)^{\frac{\kappa-1}{\kappa}} \quad (1)$$

$$V_1 > V_2 \times \left(\frac{P_b - P_1}{P_1}\right) \times \frac{T_3}{T_2} \quad (2)$$

where $P_1$ is a pressure in the upstream of the compressor; $\kappa$ is a specific heat ratio of a mixed gas of fresh air and EGR gas in the downstream of the compressor; $T_2$ is a temperature of gas in the downstream of the compressor under the maximum boost pressure ($P_b$); and $T_3$ is a temperature of gas released to the upstream of the compressor through the recirculation valve.

2. The intake device for the internal combustion engine with the supercharger according to claim 1, wherein the gas temperature $T_2$ is given by the following formula based on an efficiency ($\eta_{comp}$) of the compressor, $$T_2 = T_1 + \frac{T_2' - T_1}{\eta_{comp}/100}$$

where $T_1$ is a temperature of the gas at the upstream of compressor; and $T_2'$ is a temperature of gas after theoretical isentropic compression by the compressor from the pressure ($P_1$) in the upstream of the compressor to the maximum boost pressure ($P_b$).

3. The intake device for the internal combustion engine with the supercharger according to claim 1, wherein the gas temperature $T_3$ is determined by the following formula:

$$T_3 = T_2 \times \left(\frac{1}{\pi_c}\right)^{\frac{\kappa-1}{\kappa}} \quad (4)$$

where $\pi_c$ is a pressure ratio ($P_b/P_1$) of the compressor.

4. The intake device for the internal combustion engine with the supercharger according to claim 2, wherein the gas temperature $T_3$ is determined by the following formula:

$$T_3 = T_2 \times \left(\frac{1}{\pi_c}\right)^{\frac{\kappa-1}{\kappa}} \quad (4)$$

where $\pi_c$ is a pressure ratio ($P_b/P_1$) of the compressor.

\* \* \* \* \*